United States Patent [19]

Kondo

[11] Patent Number: 4,802,005
[45] Date of Patent: Jan. 31, 1989

[54] HIGH EFFICIENCY ENCODING SYSTEM

[75] Inventor: Tetsujiro Kondo, Kanagawa, Japan

[73] Assignee: Sony Corporation, Tokyo, Japan

[21] Appl. No.: 74,939

[22] Filed: Jul. 17, 1987

[30] Foreign Application Priority Data

Jul. 30, 1986 [JP] Japan ................... 61-179483

[51] Int. Cl.⁴ .................. H04N 7/12; H04N 7/18
[52] U.S. Cl. ...................... 358/135; 358/105; 358/133; 358/136
[58] Field of Search ............ 358/133, 135, 136, 138, 358/105, 140

[56] References Cited

U.S. PATENT DOCUMENTS

| | | | |
|---|---|---|---|
| 4,667,233 | 5/1987 | Furukawa | 358/136 |
| 4,683,494 | 7/1987 | Furukawa et al. | 358/136 |
| 4,691,329 | 9/1987 | Turi et al. | 358/133 |
| 4,692,801 | 9/1987 | Ninomiya et al. | 358/133 |
| 4,710,811 | 12/1987 | Kondo | 358/135 |
| 4,729,021 | 3/1988 | Kondo | 358/135 |

*Primary Examiner*—James J. Groody
*Assistant Examiner*—John K. Peng
*Attorney, Agent, or Firm*—Lewis H. Eslinger; Donald S. Dowden

[57] ABSTRACT

In a high efficiency encoding system, a picture is divided into many three-dimensional blocks, or blocks each consisting of n areas in each of n frames continuous in terms of time. Any movement of the picture is detected in each block to develop movement information. The picture element number of each block is sub-sampled, and the sub-sampling phases are sequentially shifted with respect to the blocks. Data of picture elements thinned by sub-sampling (i.e., not transmitted) are decoded, while data relating to a still portion of the picture is decoded with excellent results by merely combining sub-sampling patterns.

9 Claims, 9 Drawing Sheets

| A2 | B2 |
| --- | --- |
| C2 | D2 |

HIGH EFFICIENCY ENCODING SYSTEM

BACKGROUND OF THE INVENTION

1. Field of the Invention

The invention relates to a high efficiency encoding system and, more particularly, to a high efficiency encoding system for compressing the amount of data to be transmitted as compared with the original amount of data in the case of transmission of picture data such as a digital video signal.

2. Prior Art

In the transmission of a digital video signal, a method for thinning out picture elements by sub-sampling to reduce a sampling frequency is known as a method for compressing the amount of transmission data as compared with that of original data. For the sub-sampling, a method in which picture data is thinned out to ½ and sub-sampling points and flags for indicating the positions of the sub-sampling points used in the interpolation (i.e., for indicating which data at sampling points lying above and below the interpolation points and on the left-hand and right-hand sides thereof are utilized) are transmitted, has been proposed.

The present applicant has proposed a high efficiency encoding system for performing the encoding adaptive to a dynamic range by obtaining the dynamic range defined by the maximum value and the minimum value of plural picture elements, which are contained in a two-dimensional block, as described in the specification of the Japanese Patent Application No. 59-266407. Also, as described in the specification of the Japanese Patent Application No. 60-232789, a high efficiency encoding system, which performs the encoding adaptive to a dynamic range with respect to a three-dimensional block formed of picture elements of areas respectively included in plural frames, has been proposed. Further, a variable-length encoding method for changing the bit number depending on the dynamic range to keep the maximum distortion caused in the quantization constant has been proposed as described in the specification of the Japanese Patent Application No. 60-268817.

In these encoding methods adaptive to the dynamic range, all picture element data in a block are always encoded irrespective of the movement of a picture of the block. However, in the absence of the picture movement, the compression rate can be improved by encoding only picture element data of one frame in the block, that is, the so-called "frame-dropping processing," as described in the specification of the Japanese Patent Application No. 60-247840.

In an encoding method for reducing a sampling frequency using sub-sampling, data of thinned picture elements are interpolated on the reception side. However, there is a disadvantage that, at a still portion in which visually high quality is required, the interpolated picture element data exhibit remarkable deterioration. Further, there is a disadvantage that a sufficient compression rate cannot be attained with only the sub-sampling and the dynamic range adaptive encoding.

OBJECTS AND SUMMARY OF THE INVENTION

One object of the invention is, therefore, to provide a high efficiency encoding system capable of interpolating the thinned picture element data in a still block on the reception side.

Another object of the invention is to provide a high efficiency encoding system capable of improving a compression rate by the combination with an encoding method adaptive to a dynamic range of a three-dimensional block.

Still another object of the invention is to provide a high efficiency encoding system capable of providing a high compression rate with picture quality of less deterioration.

Yet another object of the invention to provide a high efficiency encoding system capable of improving the compression rate as well as of reproducing a picture in an excellent manner on the reception side using the above-mentioned encoding method adaptive to the dynamic range of the three-dimensional block and combining with a high efficiency encoding system for performing the frame-dropping processing depending on the presence and absence of movement.

A high efficiency encoding system according to the invention comprises a movement discrimination circuit for performing a discrimination of a movement of each block, which is composed of n picture elements belonging to each of n frames of a digital picture signal continuous in terms of time, to generate a discrimination code, a sub-sampling circuit for sub-sampling the picture elements of each block and sequentially shifting a phase of said sub-sampling with respect to said m blocks; and means for transmitting the discrimination code SJ and output data of the sub-sampling circuit.

For instance, the sum of the absolute values of frame differences in one block of a digital video signal is compared with a threshold value. When the sum of the absolute values is smaller than the threshold value, it is discriminated to be a still block. Also, the picture element number of each block is sub-sampled into (1/m), for instance, ½. The phases of the sub-sampling are sequentially shifted with respect to two blocks. In other words, the phase of the sub-sampling on the i-th block has a shift of one picture element with that of the sub-sampling on the (i+1)-th block. A discrimination code from a movement discrimination circuit and the output data of a sub-sampling circuit are converted at frame segmentation circuits into transmission data At a still block shown by the code, the average value of picture elements of n areas in a block is transmitted in place of original data. With the combination of this frame-dropping processing and an encoding using a dynamic-range adaptive type code with sub-sampling, a high compression rate is achieved.

In the case where thinned picture elements are interpolated on the reception side, the thinned picture elements in a block are interpolated by picture elements of a previous block by combining two blocks when these blocks are still blocks continuous in time. As a result, the quality of a reproduced picture at a still portion is enhanced as compared to the result obtained from the interpolation using ambient picture elements.

BRIEF DESCRIPTION OF THE DRAWINGS

The objects and features of the invention will be apparent from the following detailed description when taken in conjunction with the accompanying drawings, in which.

In the drawings, the same references numerals depict the same structural elements, respectively.

DESCRIPTION OF THE PREFERRED EMBODIMENT

Hereunder, an embodiment of the invention will be described referring to the drawings. This description will be given in the following order:

a. Structure on the transmission side
b. Structure on the reception side
c. Data processing operations on the transmission side and the reception side
d. Block and block segmentation circuit
e. Movement discrimination circuit
f. Subsampling
g. Encoder
h. Decoder
i. Dynamic-range detection circuit
j. Variable length encoding
k. Modification a. Structure on the transmission side

Figure 1:
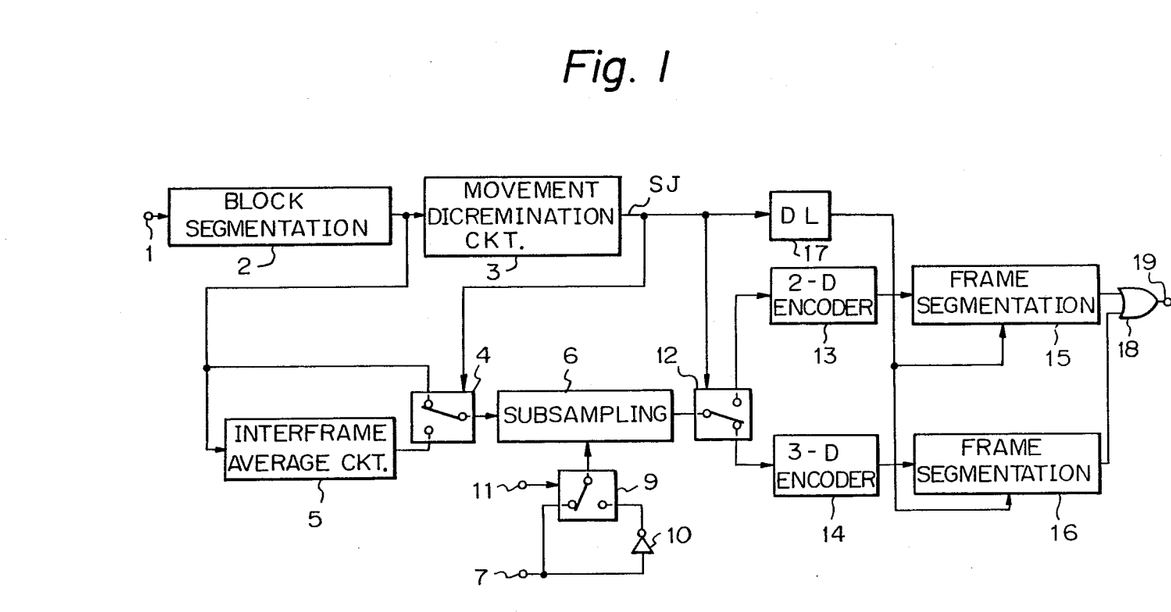
FIG. 1 is a block diagram of one embodiment of the invention.

FIG. 1 shows a whole structure of the transmission side (recording side in the case of a video tape recorder). A digital video signal (luminance signal) of which each sample is quantized into 8 bits, for instance, is given to an input terminal shown at 1. The digital video signal is supplied to a block segmentation circuit 2. At the circuit 2, the digital video signal is converted into a signal so that blocks, each of which is the unit of encoding, are continuous in the time direction. The output signal of the block segmentation circuit 2 is given to a movement discrimination circuit 3. This circuit 3 is a circuit for generating a two-bit discrimination code SJ for discriminating a still block, a quasistill and a moving block from data of picture elements at the same position between areas of each frame of a three-dimensional block (in this example, 6 lines×6 picture elements×2 frames). With respect to the motionless block, the discrimination code SJ becomes (0 0); on the quasistill block of a slight movement, the discrimination code SJ becomes (0 1); and on the moving block, the code SJ takes (1 1).

The input digital video signal from the block segmentation circuit 2 is supplied to one input terminal of a switch circuit 4 and an interframe-average-value developing circuit (referred to hereunder as "IAVD" circuit) 5. The output signal of the IAVD circuit 5 is given to the other input terminal of the switch circuit 4. When the discrimination code SJ is (0 0) or (0 1), that is, in the case of a still block or a quasistill block, the output signal of the IAVD circuit 5 is selectively obtained at an output terminal of the switch circuit 4. In the case of the code SJ of (1 1), i.e., in the case of a moving block, the input digital video signal from the block segmentation circuit 2 is selectively derived from the output terminal of the switch circuit 4.

The IAVD circuit 5 calculates the average value of 36 picture elements, which lie in the same position between two areas forming a block and outputs the average value of the 36 elements in place of picture element data of the block. Therefore, the output signal of the IAVD circuit 5 has a two-dimensional block structure in which the average value is arranged in the form of (6 lines×6 picture elements). The output signal of the switch circuit 4 is supplied to a sub-sampling circuit 6.

The sub-sampling circuit 6 carries out the sampling for reducing the number of picture elements of each block to one-half of the original number. A sampling pulse with a frequency, which is one-half of the original frequency, is supplied to an input terminal shown at 7. This sampling pulse and the sampling pulse inverted through an inverter 10 are selected at a switch circuit 9. The switch circuit 9 is switched every n frames (n=2 in this example) of a three-dimensional block by a switch control pulse from a terminal 11. As a result, in the sampling patterns of two blocks occupying the same position on the picture and continuous in time, picture elements, which are subjected to sub-sampling, have a shift with each other by one picture element. In other words, the sampling patterns are complementary between these two blocks.

The output signal of the su-sampling circuit 6 is given to a switch circuit 12. The circuit 12 is controlled by the discrimination code SJ in a manner similar to the switch circuit 4. Data of a still block and a quasistill block selected by the switch circuit 12 are supplied to a two-dimensional (2-D) encoder 13, while data of a moving block selected by the switch circuit 12 are given to a three-dimensional (3-D) encoder 14.

Encoding with the variable bit number adaptive to the dynamic range of every block is performed in the 2-D encoder 13 and the 3-D encoder 14. From these encoders 13 and 14, a dynamic range DR of every block, a minimum level MIN and a code signal DT of 0 to five bits are provided.

The output signals of the 2-D encoder 13 and the 3-D encoder 14 are supplied to frame segmentation circuits 15 and 16, respectively. The discrimination code SJ is given to the frame segmentation circuits 15 and 16 via a delay circuit 17 for phase adjustment. In this embodiment, the code SJ, the code signal DT, the dynamic range DR, and the minimum value MIN are transmitted. These data are converted into transmission data in said circuits 15 and 16. As the format of transmission data, the following one can be used: the encoding of applying a separate error correction code to each of data portions, which consists of the discrimination code SJ, the dynamic range DR, the minimum value MIN and the code signal DT is done for transmission added with a parity of each error correction code. Also, the encoding of separate error correction codes may be done for each of the discrimination code SJ, the dynamic range DR and the minimum value MIN other than the code signal DT. Further, the encoding of a common error correction code may be performed for the discrimination code SJ, the dynamic range DR, and the minimum value MIN with the addition of parity. The output signals of the frame segmentation circuits 15 and 16 are supplied to an OR gate 18, and transmission data can be taken out of an output terminal 19 of the OR gate 18. These transmission data are sent in the form of serial data (or recorded in a recording medium), although not shown.

b. Structure on the reception side

Figure 2:
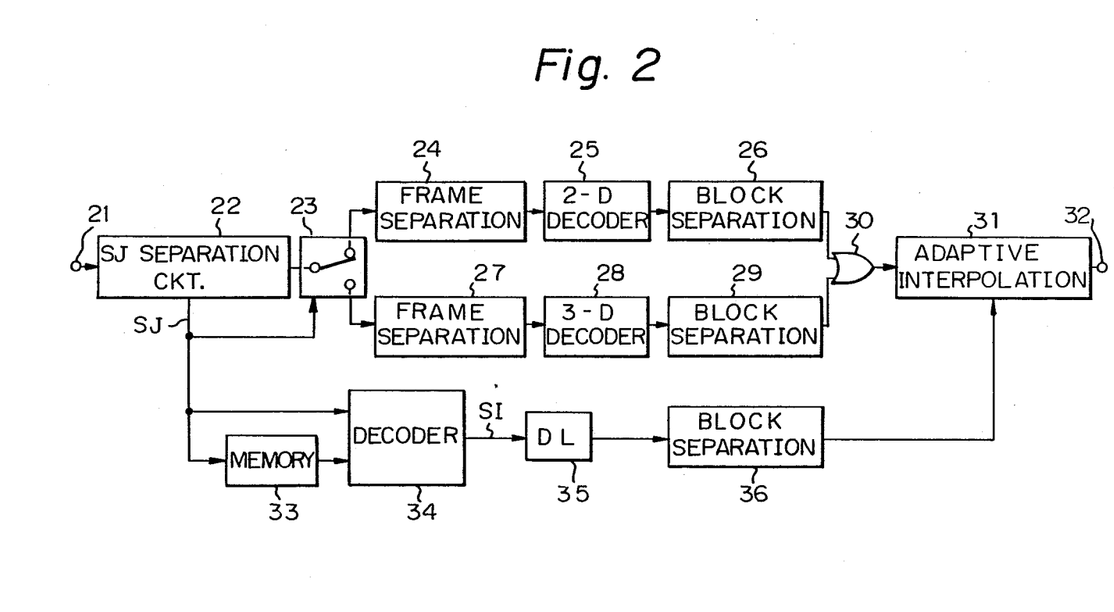
FIG. 2 is a block diagram showing a structure on the reception side.

FIG. 2 shows a structure on the reception (or reproduction) side. Reception data from an input terminal 21 is supplied to a discrimination-code separation circuit 22 so that the discrimination code SJ is separated. Added data and a code signal other than the discrimination code SJ are given to a switch circuit 23. The code SJ is supplied to the circuit 23. The code signal and the added data of average value information of a still block and a quasistill block are separated by the switch circuit 23. The average value information is supplied to a frame separation circuit 24. The code signal and added data of a moving block separated from the switch circuit 23 are fed to a frame separation circuit 27. The code signal DT and the added codes DR and MIN are separated by the frame separation circuits 24 and 27 and subjected to error correction processing therein. The code signal DT and the added codes are supplied to a 2-D decoder 25 and a 3-D decoder 28, respectively.

These decoders 25 and 28 execute the reverse processing to that of the encoders 13 and 14 on the transmission side. Namely, data DTI after the elimination of the minimum level of 8 bits are reproduced as a representative level. The data is added to the 8-bit minimum value MIN to reproduce original picture element data.

In the 2-D decoder 25, decoded outputs of a still block and a quasistill block for which the frame-dropping processing is made, are developed. The output signal of the 2-D decoder 25 is given to a block separation circuit 26. In the 3-D decoder 28, the decoded output of a moving block is developed. The output signal of the 3-D decoder 28 is supplied to a block separation circuit 29. The output signals of the circuits 26 and 29 are given to an OR gate 30. The output signal of the OR gate 30 is supplied to an adaptive interpolation circuit 31. The output signal of the circuit 31 is taken out of an output terminal 32.

The block separation circuits 26 and 29 are the circuits for converting decoded data from block order into the order similar to the scanning of a television signal.

In the adaptive interpolation circuit 31, picture element data, which are not transmitted, are interpolated. In the circuit 31, one of three interpolation systems is selected depending on the relationship between a discrimination code $SJ_{i-1}$ of a previous block and a discrimination code of the present or current block in terms of time. An interpolation control signal SI for selecting an interpolation system is developed at a decoder 34. The discrimination code SJ ($SJ_i$) from the discrimination-code separation circuit 22 and the discrimination code $SJ_{i-1}$ of the previous block in terms of time from a memory 33 are supplied to the decoder 34. The interpolation control signal SI from the decoder 34 is given to a block separation circuit 36 through a delay circuit 35 for phase adjustment.

The control signal SI is a code of two bits, which varies every six continuous picture elements in terms of time. At the adaptive interpolation circuit 31, three interpolation systems, or time-direction interpolation, intraframe interpolation and intrafield interpolation are selected adaptively. The time-direction interpolation is opposed to the intraframe interpolation and the intrafield interpolation, which are in the space direction, to perform the interpolation for combining the picture elements of two blocks continuous in terms of time. In this time-direction interpolation, the fact that a sampling pattern is shifted by one frame between two blocks is utilized effectively. The intraframe interpolation is the interpolation using data within the same frame. For instance, the interpolation is done by the average value of sub-sampled data, which are positioned above and below interpolation points and on the left-hand and right-hand sides thereof. The intrafield interpolation is the interpolation using data within the same field. For example, the interpolation is made by the average value of sub-sampled data positioned on the left-hand and right-hand sides of interpolation points on the same line. An interpolation system is selected by an interpolation control signal SI as follows:

In the case of (SI=00): the time-direction interpolation

In the case of (SI=10): the intraframe interpolation

In the case of (SI=11): the intrafield interpolation

As mentioned above, the discrimination code SJ is defined as follows:

(Still block: SJ=00), (Quasistill block: SJ=01), (Moving block: SJ=11).

In the decoder 34, the interpolation control signal SI is developed from the discrimination code $SJ_{i-1}$ of a previous block and the discrimination code $SJ_i$ of the present block as follows:

|        |    | $SJ_{i-1}$ |    |    |
|--------|----|-----|----|----|
|        |    | 00  | 01 | 11 |
| $SJ_i$ | 00 | 00  | 00 | 10 |
|        | 01 | 00  | 10 | 10 |
|        | 11 | 11  | 11 | 11 |

For example, in the case where the present block is a still block and a previous block is a still block or a quasistill block, (SI=00) is established with the interpolation in the time direction. In the case where the present block is a moving block, (SI=11) is established irrespective of the discrimination of movement on the previous block, with the intrafield interpolation.

c. Data processing operations on the transmission side and the reception side

Figure 3:
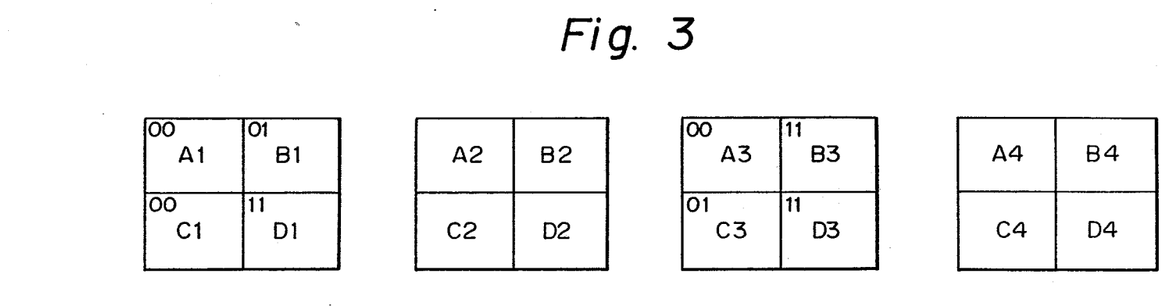
FIGS. 3, 4, 5 and 6 are schematic diagrams for describing the entire operation on the transmission and reception sides.

FIG. 3 is an example of a digital video signal supplied to the input terminal 1 on the transmission side. For simplicity of explanation, one frame picture is divided into four areas A, B, C and D. In FIG. 3, four frames, which are continuous with respect to time, are shown, and two areas (A1, A2), (B1, B2) ... (D3, D4) belonging to two frames, respectively, form blocks. Also, in FIG. 3, an example of a two-bit movement discrimination code SJ relating to each block is shown. For example, the block consisting of (A1, A2) is (SJ=00), i.e., a still block. The block consisting of (B1, B2) is (SJ=01), i.e., a quasistill block. The block consisting of (C1, C2) is (SJ=00), i.e., a still block, and the block consisting of (D1, D2) is (SJ=11), i.e., a moving block.

Figure 4:
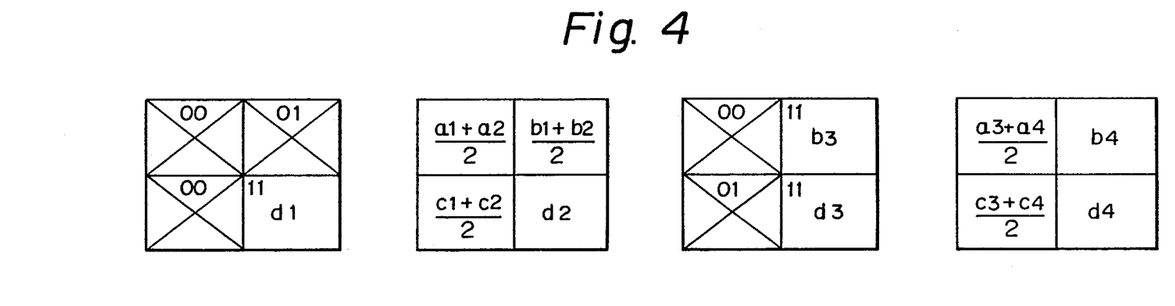

On the transmission side, the frame-dropping processing, sub-sampling and encoding adaptive to the dynamic range are performed. Assuming that output data obtained through the encoding process adaptive to the dynamic range for the areas A, B, C and D are represented by a, b, c and d, encoded data on the transmission side become as shown in FIG. 4. That is, the interframe average value (A1+A2)/2 of two areas, for instance, A1 and A2, is developed in a still area and a quasistill area. This interframe average value is encoded in the 2-D encoder 13 to provide encoded data of (a1+a2)/2. Also, areas of a moving block, for example, D1 and D2 are encoded into d1 and d2, respectively.

Figure 5:
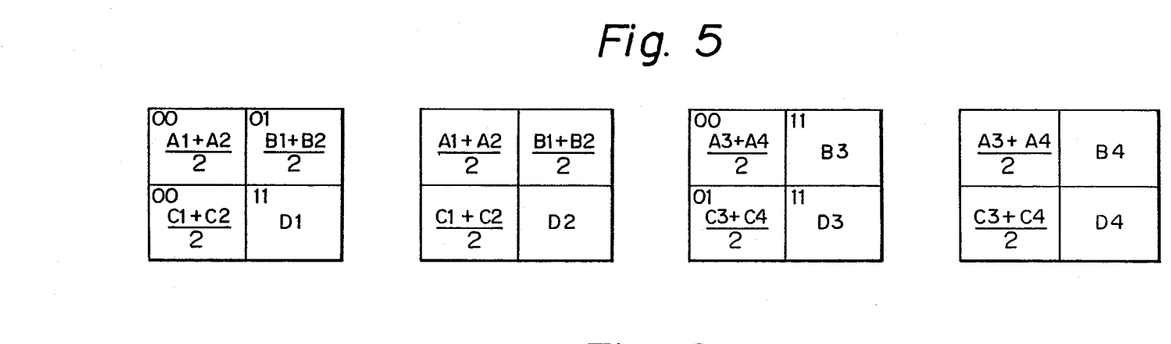

The encoded data are decoded on the reception side so that decoded data shown in FIG. 5 are obtained from an OR gate 30. In a still block and a quasistill block, the average value of two areas is decoded. In a moving block, picture element data of each area are decoded. The decoded data shown in FIG. 5 contain data thinned by ½ by sub-sampling, sampling and, the thinned picture elements are interpolated at the adaptive interpolation circuit 31.

Figure 6:
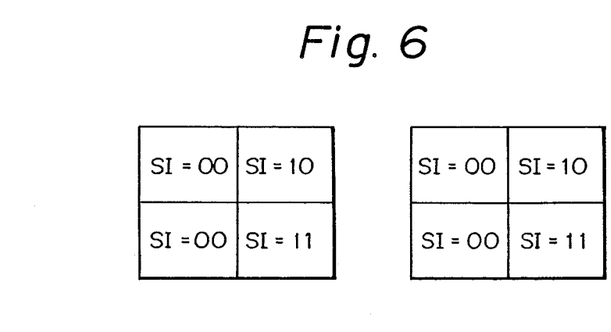

The interpolation manner is defined by the interpolation control signal SI developed by the discrimination code $SJ_{i-1}$ of a previous block and the discrimination code $SJ_i$ of the present or current block as mentioned before. Assuming that four blocks formed of the eight areas A3, B3 . . . C4, D4 are the present blocks, the interpolation control signal SI corresponding to decoded data (refer to FIG. 5) is developed as shown in FIG. 6. For example, the area of (A3+A4)/2 is made to (SI=00) from ($SJ_{i-1}$=00) ($SJ_i$=00) with the interpolation in the time direction. The areas of D3 and D4 are made to (SI=11) from ($SJ_{i-1}$=11) ($SJ_i$=11) with the intrafield interpolation.

d. Block and block segmentation circuit

Figure 7:
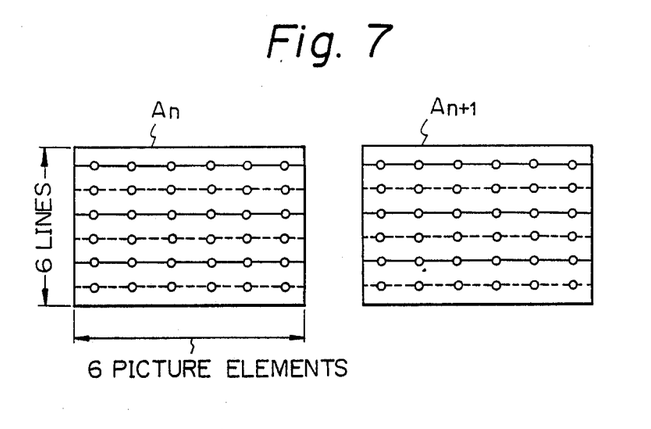
FIG. 7 is a schematic diagram for describing a block, which is a processing unit for encoding.

Referring to FIG. 7, a block, which is a unit for encoding, will be described. In the embodiment, a three-dimensional block is constituted by two-dimensional areas An and An+1 belonging to two continuous frames in terms of time, respectively. In FIG. 7, solid lines show lines in an odd field, while broken lines show those in an even field. Six picture elements contained in six lines of each frame, respectively, construct the areas An and An+1 (6 lines×6 picture elements). Therefore, one block consists of (6×6×2=72) picture elements.

Figure 8:
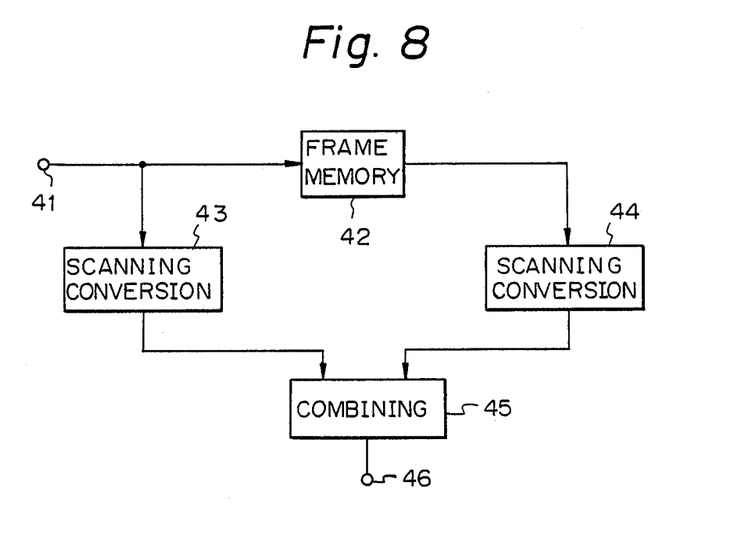
FIGS. 8 and 9 are an example of a structure and an operation of a segmentation circuit.
Figure 9A:
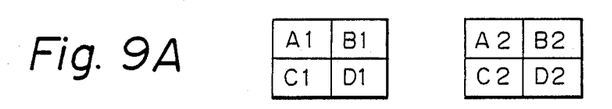
Figure 9B:
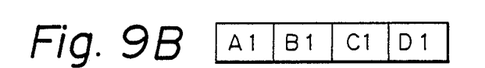
Figure 9C:
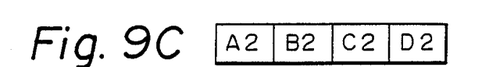
Figure 9D:
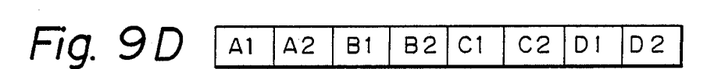

FIG. 8 shows an example of a structure of the above-mentioned block segmentation circuit 2. A frame memory 42 is connected to an input terminal 41. Picture element data of the present frame are supplied to a scanning conversion circuit 43, and picture element data of a previous frame are given to a scanning conversion circuit 44. The respective output signals of the circuits 43 and 44 are supplied to a combination circuit 45 composed of a delay circuit and a switch circuit. A digital video signal converted to block order appears at an output terminal 46 of said circuit 45.

For simplicity, in the case where a picture of one frame is divided into four, a previous frame is divided into the areas A1, B1, C1 and D1 as shown at A of FIG. 9. The present frame is divided into the areas A2, B2, C2 and D2. The scanning conversion circuit 43 converts the order of data in one frame into the order of every area of a block as indicated at B of FIG. 9. The other scanning conversion circuit 44 converts the order of data in one frame into the order of every area of a block as shown at C of FIG. 9 in a similar manner.

At the output terminal 46 of the combination circuit 45, picture element data of four areas respectively included in two continuous frames, are obtained as output data converted to block order.

e. Movement discrimination circuit

Figure 10:
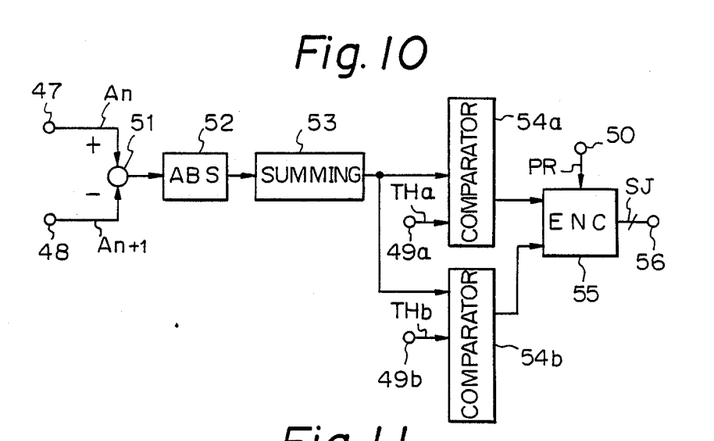
FIG. 10 is a block diagram of one example of a movement discrimination circuit.

FIG. 10 shows an example of the movement discrimination circuit 3. In FIG. 10, 47 and 48 are input terminals to which are supplied picture data of the areas An and An+1 belonging to two frames of one block continuous in time, respectively. The input data are developed by arranging the output data of the block segmentation circuit 2 in parallel every block. Threshold value data THa and THb are supplied to terminals shown at 49a and 49b respectively, and a reset pulse PR is given to a terminal shown at 50. The threshold value THb is made larger than the threshold value THa. The absolute value of a level difference (frame difference) of picture elements of the corresponding positions between the area An and the area An+1 is developed by a subtractor 51 and an absolute-value forming circuit 52. The absolute value of the frame difference is supplied to a summing circuit 53. The output signal of the summing circuit 53 is given to comparators 54a and 54b. A summed value of the absolute values of the frame differences with respect to one block is compared with the threshold value data THa at the comparator 54a. In addition, this summed value is compared with the threshold value THb by the comparator 54b. A binary comparison output corresponding to each level relationship between the summed value of the absolute values of frame differences and threshold value data THa and THb is supplied to an encoder 55. When the summed value of the absolute values of the frame differences is equal to or smaller than the threshold value data THa, the encoder 55 decides that there is no change between both, or there is a still block. Also, when the summed value of the absolute values of the frame differences exceeds the threshold value data THa and is equal to or less than the threshold value data THb, it is decided to be a quasistill block. Further, if the summed value is larger than the threshold value data THa and THb, it is decided to be a moving block. The reset pulse PR of every block is supplied to the encoder 55. The two-bit output of the encoder 55 is taken out at an output terminal 56 as the discrimination code SJ.

In the case of (SJ=00) or (SJ=01), since the pictures of the areas An and An+1 in the block are almost the same, only the average value of both, or (An+An+1)/2 is encoded by the 2-D encoder 13. Consequently, one area of the two areas is frame-dropped. In the case of (SJ=11), picture element data included in both of the two areas An and An+1 are encoded by the 3-D encoder 14.

As mentioned above, by deciding whether or not it is a still portion every block, the transmission of a code signal on the still portion occupying a large part of the picture can be reduced to enhance the data compression rate greatly.

It is to be noted that another structure deciding whether the maximum value of the absolute values of frame differences between two frames is equal to or less than the threshold value can be used as the movement discrimination circuit 3.

f. Sub-sampling

Figure 11:
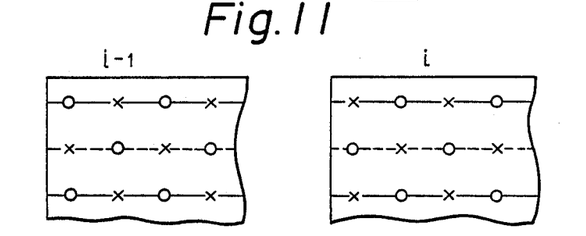
FIG. 11 is a schematic diagram for describing a sub-sampling operation.

The sub-sampling in the sub-sampling circuit 6 is done as shown in FIG. 11, so that the sampling patterns of the (i−1)-th block and that of the i-th block are complementary with each other. The above-mentioned time-direction interpolation in the adaptive interpolation circuit 31 is made by combining the complementary sampling patterns. In the case where both the (i−1)-th block and the i-th block are still blocks, an excellent reproduction picture can be obtained merely by combining both through their superimposition, since the blocks have the same picture.

g. Encoder

Figure 12:
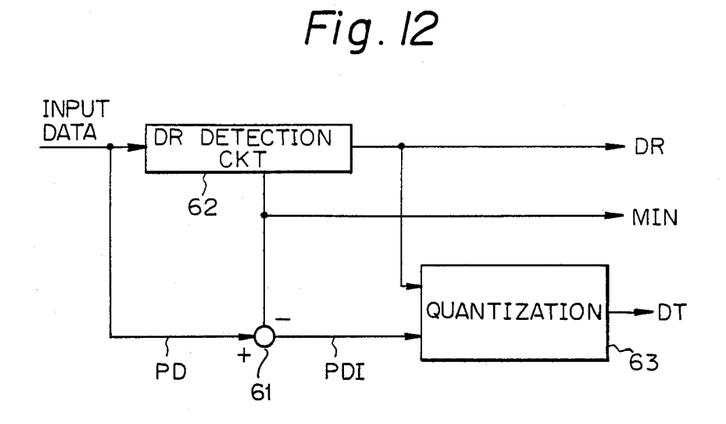
FIG. 12 is a block diagram for showing a structure of an encoder.

Both of the 2-D encoder 13 and the 3-D encoder 14 perform variable length encoding adaptive to the dynamic range DR. The encoders 13 and 14 have the same structure except that they are different in number of picture elements included in one block. FIG. 12 shows an example of an encoder usable as the 3-D encoder 14.

Figure 13:
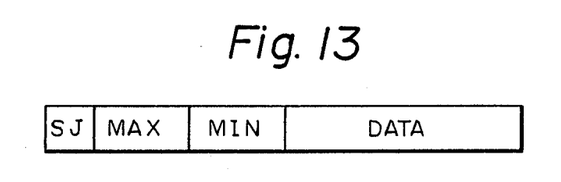
FIG. 13 is a schematic diagram for showing a structure of transmission data.

In FIG. 12, picture element data PD of one block is supplied to a dynamic range detection circuit shown at 62, so that the dynamic range DR and minimum value MIN of a block can be detected. The minimum value MIN is subtracted from each picture element data at a subtracter 61 to develop data PDI after the elimination of the minimum value. The data PDI and the dynamic range DR are supplied to a quantization circuit 63. A code signal DT of the compressed bit number is obtained from the circuit 63. The dynamic range DR, the minimum value MIN and the code signal DT are supplied to the frame segmentation circuit 16. In the frame segmentation circuit 16, the discrimination code SJ, the dynamic range DR, the minimum value MIN, and the code signal DT are converted into serial data as shown in FIG. 13.

The 3-D encoder 13 has the same structure as the above-mentioned encoder shown in FIG. 12, and average value data are given as input data from the above-mentioned IAVD circuit 5.

The quantization circuit 63 is made up of, for example, a ROM. Data conversion tables for converting the picture element data PDI (8 bits) after the elimination of the minimum value into the compressed bit number are stored in the ROM. In the ROM, the data conversion tables are selected depending on the magnitude of the dynamic range DR, and the code signal DT of five bits is taken out as read-out output. The bit number of the code signal DT changes within the range of 0 to 5 bits. As a result, effective bit length of the code output from the ROM varies. The effective bits are selected at the frame segmentation circuits 15 and 16.

h. Decoder

Figure 14:
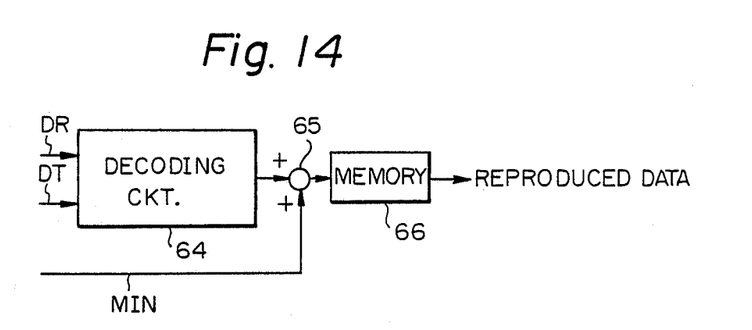
FIG. 14 is a block diagram for showing a structure of a two-dimensional decoder.

The 2-D decoder 25 and the 3-D decoder 28 are circuits for performing the reverse processing to the encoders 13 and 14. FIG. 14 shows a structure of one example of the decoder 25. The dynamic range DR and the code signal DT from the frame separation circuit 24 at the previous stage are supplied to a decoding circuit 64. This circuit 64 is composed of, for example, a ROM, and data of a decoding level corresponding to average value data after the elimination of the minimum value is obtained. This data is supplied to an addition circuit 65 and added to the minimum MIN. As a result, a signal of the decoding level corresponding to the average value data is developed.

Since compression by frame dropping is done in the case of a still block, the output signal of the addition circuit 65 is written into a memory 66, so that the average value data of areas whose transmission is omitted can be taken out of the memory 66.

The 3-D decoder 28 has the same structure as the 2-D decoder 25. However, in the case of a moving block, picture element data of each area are all decoded, and there is no need to provide a memory.

i. Dynamic-range detection circuit

Figure 15:
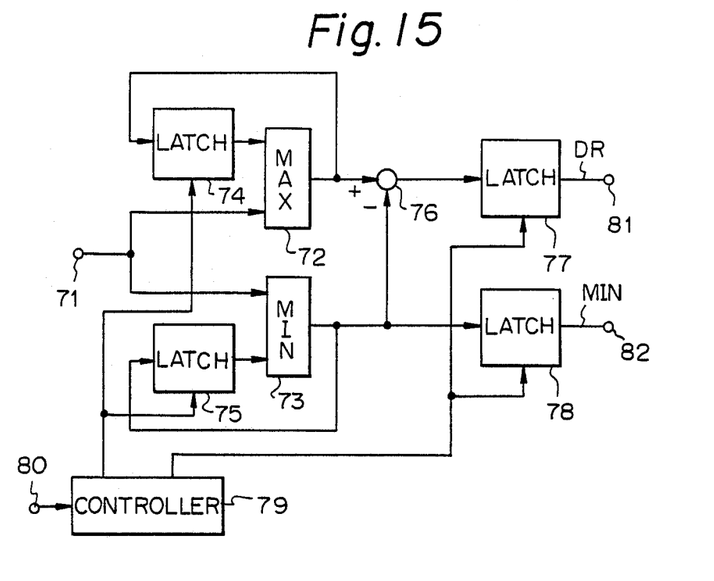
FIG. 15 is a block diagram of a dynamic-range detection circuit.
Figure 16A:
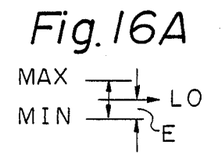
FIG. 16 is a schematic diagram for describing variable length encoding.
Figure 16B:
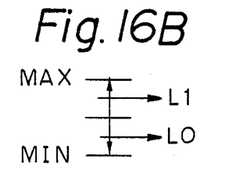
Figure 16C:
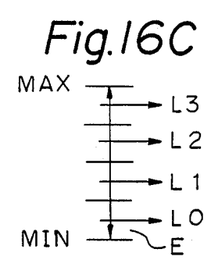
Figure 16D:
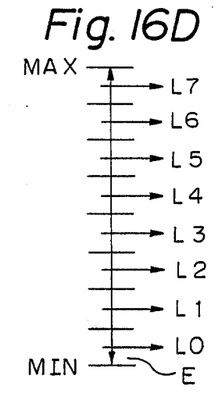
Figure 16E:
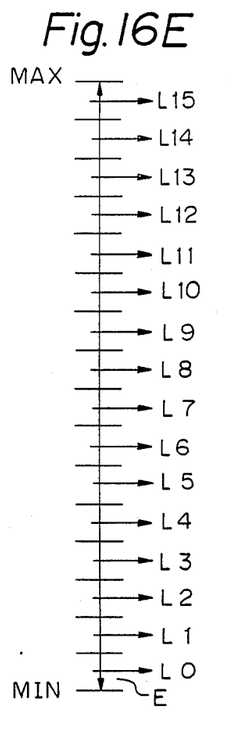
Figure 16F:
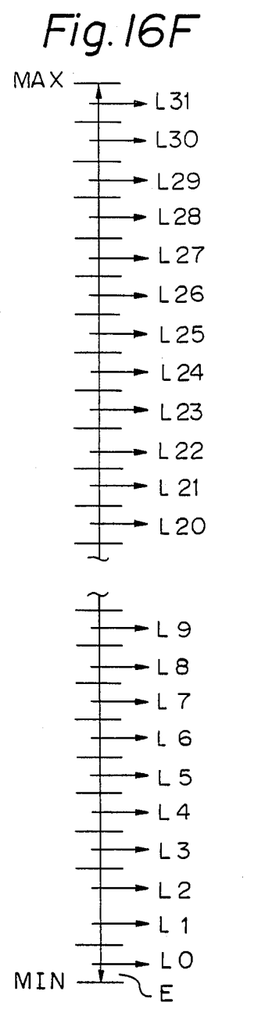

FIG. 15 shows an example of a structure of a dynamic-range detection circuit 62 provided in the 2-D encoder 13 and the 3-D encoder 14. In FIG. 15, picture element data of an area necessary for encoding of every block are sequentially supplied to an input terminal shown at 71 from the sub-sampling system 6 mentioned before. The picture element data from the input terminal 71 are given to a selector 72 and a selector 73. One selector 72 selects as its output the larger of picture element data of an input digital video signal and output data of a latch 74. The other selector 73 selects a as its output the smaller of picture element data of the input digital video signal and output data of a latch 75.

The output data of the selector 72 is supplied to a subtractor 76 and taken into the latch 74. The output data of the selector 73 is given to the subtractor 76 and a latch 78 and taken into the latch 75. A latch pulse is given to the latches 74 and 75 from a control unit 79. Timing signals such as a sampling clock, which are in synchronism with the input digital video signal, are supplied to the control unit 79 from a terminal 80. The control unit 79 supplies latch pulses to the latches 74 and 75 and the latches 77 and 78 at a predetermined timing. The contents of the latches 74 and 75 are initially set at the beginning of each block. All '0' data are initially set at the latch 74, whereas all '1' data are initially set at the latch 75. The maximum level among the picture element data of the same block, which are sequentially supplied, is stored in the latch 74. The minimum level among the picture element data of the same block, which are sequentially supplied, is stored in the latch 75.

As soon as the detection of the maximum level and the minimum level is completed with respect to one block, the maximum level of the block appears at the output of the selector 72, whereas the minimum value of the block appears at the output of the selector 73. In response to the completion of the detection on one block, the initial setting of the latches 74 and 75 is executed.

At the output of the subtractor 76, the dynamic range of each block, which is the difference between the maximum level MAX from the selector 72 and the minimum level MIN from the selector 73, is obtained. The dynamic range DR and the minimum level MIN are latched at latches 77 and 78, respectively, by latch pulses from the control unit 79. The dynamic range DR of each block is obtained at an output terminal 81 of the latch 77, and at an output terminal 82 of the latch 78, the minimum value MIN is obtained.

j. Variable length encoding

FIG. 16 is for describing the encoding of a variable bit number adaptive to the dynamic range made at the above-mentioned quantization circuit 63. This encoding is a processing for converting picture element data after the elimination of the minimum value into a representative level. The tolerable maximum value (called maximum distortion) of quantization distortions occurring in this quantization is made to a predetermined value, for instance, 4.

A of FIG. 16 shows the case of the dynamic range of 8 (difference between the maximum value MAX and the minimum value MIN). In the case of (DR=8), a level 4 of the center is brought to a representative level L0 to make (maximum distortion E=4). Namely, in the case of ($0 \leq DR \leq 8$), the central level of the dynamic range is defined as the representative level, and there is no need to transmit quantized data. As a result, necessary bit-length Nb is 0. On the reception side, the decoding for bringing the representative level L0 to a decoded value is done on the basis of the minimum value MIN and the dynamic range DR of a block.

B of FIG. 16 shows the case of (DR=17), and representative levels are defined as (L0=4) (11=13), respectively, with tee maximum distortion E equal to 4. Since there are two representative levels L0 and L1, (Nb=1) is established. In the case of ($9 \leq DR \leq 17$), (Nb=1) is established. The maximum distortion E becomes small as the dynamic range DR becomes narrow.

C of FIG. 16 shows the case where (DR=35) where representative levels are defined as (L0=4) (L1=13) (L2=22) (L3=31), respectively, and (E4=4) is established. Since there are four representative levels L0 to L3, (Nb=2) is established. In the case of ($18 \leq DR \leq 35$), (Nb=2) is defined.

In the case of ($36 \leq DR \leq 71$), eight representative levels (L0 to L7) are employed. D of FIG. 16 shows the case of (DR=71) where representative levels are defined as (L0=4) (L1=13) (L2=22) (L3=31) (L4=40) (L5=49) (L6=58) (L7=67), respectively. To distinguish the eight representative levels L0 to L7 from one another, (Nb=3) is established.

In the case of ($72 \leq DR \leq 143$), 16 representative levels (L0 to L15) are used. E of FIG. 16 shows the case of (DR=143) where representative levels are defined as (L8=76) (L9=85) (L10=94) (L11=103) (L12=112) (L13=121) (L14=130) (L15=139) (L0 to L7 are the same as the above-mentioned values). To make a distinction among the 16 representative levels (L0 to L15), (Nb=4) is defined.

In the case of ($144 \leq DR \leq 287$), 32 representative levels (L0 to L31) are employed. F of FIG. 16 shows the case of (DR=287) where representative levels are defined as (L16=148) (L17=157) (L18=166) (L19=175) . . . (L27=247) (L28=256) (L29=265) (L30=274) (L0 to L15 are the same as the above-mentioned values). To distinguish the 32 representative levels from one another, (Nb=5) is defined. Actually, since input picture element data are quantized with 8 bits, the maximum value of the dynamic range DR is 255 so that no quantization into the representative levels (L28 to L31) is performed.

Because a television signal in one block has a three-dimensional correlation on the two-dimensional direction of the horizontal and vertical directions and the time direction, the amplitude of level change of picture element data contained in the same block is small at a stationary portion. As a result, even when the dynamic range of data DTI after the elimination of the minimum level MIN shared by picture element data in the block is quantized with the quantization bit number less than the original quantization bit number, the quantization distortions rarely occur. By the reduction of the quantization bit number, the data transmission band can be made smaller than the original one.

k. Modification

In this invention, the sub-sampling rate is not limited to ½ and may be equal to or larger than ¼. For example, in the sub-sampling of ⅓, sub-sampling points are shifted by one picture element over three blocks continuous in time.

Figure 17:
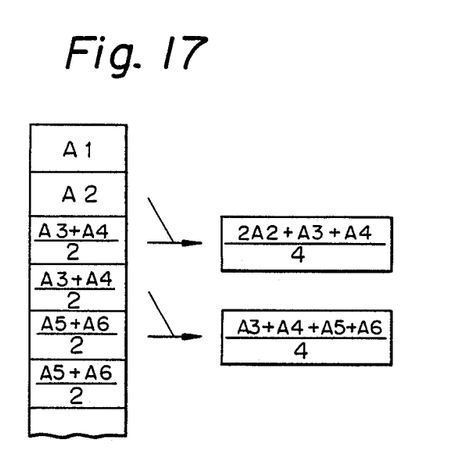
FIG. 17 is a schematic diagram for describing a smoothing operation.

Also, when attention is paid to one block of a picture, a smoothing processing for incorporating picture data of a previous block into picture data of the first one of two areas forming a still block may be performed at the adaptive interpolation circuit 31. Namely, when the area A2 of the previous block is moved to the area (A3+A4)/2 of the interframe average value as shown in FIG. 17, the average value (2A2+A3+A4)/4 of data of that area and data of the area of the previous block is employed in place of data of (A3+A4)/2. Similarly, instead of data (A5+A6)/2 of the next block lying in the boundary with the previous block, (A3+A4+A5+A6)/4 is used.

Since a picture in which picture information of the previous block and the present block is mixed, appears between different blocks continuous in time through the above-mentioned smoothing processing, jerkiness at which the movement of an object in the picture becomes discontinuous, is reduced.

Further, the invention is applicable not only to a variable length encoding system but also to a fixed length encoding system. In the fixed length encoding system, the dynamic range DR of every block is divided into the level range of the number defined by the quantization bit number, and a code signal of a predetermined bit number corresponding to a level range to which data after the elimination of the minimum value belong is developed.

In this one embodiment, the middle values L0, L1, L2, L3 . . . of each area obtained by the division of the dynamic range are employed as values at the decoding time as shown in FIG. 16. This encoding method enables the quantization distortions to be small.

Figure 18:
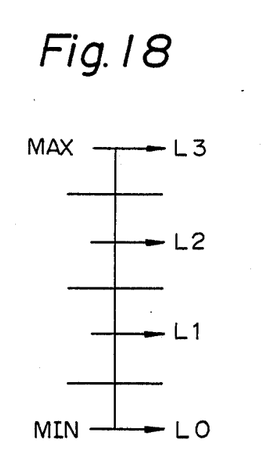
FIG. 18 is a schematic diagram for describing another example of quantization.

Meanwhile, a number of picture element data having respective levels of the minimum level MIN and the maximum level MAX are necessarily present in one block. For this reason, to provide a number of code signals having no error, the dynamic range DR is divided into ($2^m - 1$) (where m is the quantization bit number) as shown in FIG. 18, defining the minimum level MIN as the representative minimum level L0 and the maximum level MAX as the representative maximum level L3. The example of FIG. 18 shows the case of the quantization bit number of two bits.

In the foregoing description, the code signal DT, the dynamic range DR, the minimum value MIN and the discrimination code SJ are transmitted. However, the maximum value MAX, the quantization step or the maximum distortion may be transmitted as the added codes instead of the dynamic range DR.

Also, data of one block may be taken out simultaneously by a circuit of combination of a frame memory, a line delay circuit and a sample delay circuit.

Further, a three-dimensional block may be composed of n-frame data of more than three frames, without being limited to two frames.

According to the invention, the phase of sub-sampling is shifted in a period of m blocks in addition to the reduction of the sub-sampling frequency of transmitted data by 1/m sub-sampling. As a result, the interpolation of a still block whose deterioration tends to be visually noticeable can simply be performed in an excellent manner, and decoded pictures of good quality can be obtained.

Although various aspects of our invention have been described and illustrated in the above embodiment, one skilled in the art will appreciate that various modifications can be made without departing from the spirit and scope of the Invention.

What is claimed is:

1. Coding apparatus for coding digital video data in a format composed of blocks of digital video data representing a three-dimensional group of picture elements belonging to a plurality of frames and for allowing compression of the video data, said coding apparatus comprising:
   movement discriminating means for detecting movement in each block and generating a discriminating code indicative of detected movement;
   sub-sampling means for sub-sampling picture elements in predetermined positions in each of said blocks of digital video data to reduce the number of picture elements in each said blocks to 1/n of the original number of the picture elements in each of said blocks, the sub-sampling of said picture elements in a time-sequential blocks by said sub-sampling means having phases that are shifted sequentially; and
   encoding and transmitting means for encoding an output of said sub-sampling means and transmitting the discriminating code and the encoded output of said sub-sampling means.

2. Coding apparatus according to claim 1, wherein said encoding and transmitting means includes compression encoding means for encoding output data of said sub-sampling means into compressed data.

3. Coding apparatus according to claim 2, wherein said sub-sampling means includes averaging means for averaging digital data of plural video frames and means for sub-sampling an output of said averaging means when said discriminating code indicates that no movement exists among said plural video frames.

4. Coding apparatus according to claim 3, wherein said compression encoding means includes first and second encoding means for two-dimensional and three-dimensional blocks, respectively, and output data of said sub-sampling means is supplied to said first and second encoding means selectively and controlled by said discriminating code.

5. Coding apparatus according to claim 1, wherein said movement discriminating means includes: a first comparator for comparing digital data of a picture element in a first video frame and digital data of a corresponding picture element in a second video frame; absolute value generating means supplied with an output of said first comparator to generate an absolute value of said output of the first comparator; a second comparator for comparing an output of said absolute value generating means with a reference value; and detecting means responsive to an output of said second comparator.

6. Decoding apparatus for decoding data transmitted by a coding apparatus for coding digital data in a format composed of blocks of digital video data representing a three-dimensional group of picture elements belonging to a plurality of frames and for allowing compression of the video data, said coding apparatus having movement discriminating means for detecting movement in each block and generating a discriminating code indicative of detected movement; sub-sampling means for sub-sampling picture elements in predetermined positions in each of said blocks of digital video data to reduce the number of picture elements in each of said blocks to 1/n of the original number of the picture elements in each of said blocks, thereby producing thinned-out data, the sub-sampling of said picture elements in n time-sequential blocks by said sub-sampling means having phases that are shifted sequentially; and encoding and transmitting means for encoding an output of said sub-sampling means and transmitting the discriminating code and the encoded output of said sub-sampling means, said decoding apparatus comprising:
   discriminating code separating means for separating said discriminating code from said encoded and transmitted output of said sub-sampling means; and
   adaptive interpolation means for interpolating thinned-out data from actually transmitted data, an operation of said interpolation means being responsive to said discriminating code.

7. Decoding apparatus according to claim 6, wherein the operation of said interpolation means is controlled by n discriminating codes respectively corresponding to the n time-sequential blocks.

8. Decoding apparatus according to claim 7, wherein one of said n blocks is a current block and said interpolation means interpolates said thinned-out data by combining data of said n blocks when all discriminating codes indicate that no movement exists in said blocks and said interpolation means interpolates said thinned-out data from data in the same video field that said thinned-out data belongs to when the discriminating code of said current block indicates that movement exists in said current block.

9. Coding apparatus for coding original digital video data in a format composed of blocks of digital data representing plural picture elements and for allowing compression of the original digital video data, said apparatus comprising:
   movement discriminating means for detecting movement in each block and generating a discriminating code indicative of detected movement;
   sub-sampling means for sub-sampling said original digital video data in each of said blocks to reduce the number of picture elements to 1/n of the original number of the picture elements in each of said blocks;
   first and second detecting means for detecting maximum and minimum values, respectively, of sub-sampled digital video data representing plural picture elements in each of said blocks;
   means for generating dynamic range information for each of said blocks from said maximum and minimum values for respective blocks;
   means for generating modified digital video data for each of said blocks as a difference between each of the sub-sampled original digital video data and said minimum value for said respective blocks;
   means for encoding said modified digital video data using a number of bits less than the number of bits in the original digital video data so as to provide coded data of a reduced bit length; and
   transmitting means for transmitting the discriminating code, the coded data of reduced bit length and an additional code for each of said respective blocks, said additional code being formed of at least two of said maximum value, said minimum value, and a signal corresponding to said dynamic range information.

* * * * *

UNITED STATES PATENT AND TRADEMARK OFFICE
CERTIFICATE OF CORRECTION

PATENT NO. : 4,802,005
DATED : January 31, 1989
INVENTOR(S) : Tetsujiro kondo

It is certified that error appears in the above-identified patent and that said Letters Patent is hereby corrected as shown below:

```
Column  2, line 20, change "and" to --or--;
           line 29, delete "m".
Column  4, line 42, change "su-sampling" to --sub-sampling--;
           line 66, after "of" insert --the--.
Column  5, line  1, after "DT" insert --,--.
Column  7, line 23, change "sampling and," to --and--.
Column  8, line 18, after "49b" insert --,--.
Column  9, line 17, delete "of".
Column 10, line 23, delete "a" second occurence.
Column 11, line 19, change "tee" to --the--.

IN CLAIMS
Column 13, line 27, change "a" to --n--.
```

Signed and Sealed this

Eighteenth Day of July, 1989

Attest:

DONALD J. QUIGG

Attesting Officer

Commissioner of Patents and Trademarks